UNITED STATES PATENT OFFICE.

EMILE REYNIER, OF PARIS, FRANCE, ASSIGNOR TO SIMON PHILIPPART, THE SON, MANAGER OF LA FORCE ET LA LUMIÈRE SOCIÉTÉ GÉNÉRALE D' ELECTRICITE, OF BRUSSELS, BELGIUM.

ELECTRO-CHEMICAL TREATMENT OF ORES.

SPECIFICATION forming part of Letters Patent No. 246,201, dated August 23, 1881.

Application filed April 14, 1881. (No model.) Patented in Belgium March 28, 1881, and in France March 29, 1881.

*To all whom it may concern:*

Be it known that I, EMILE REYNIER, of Paris, in the Republic of France, have invented a new and useful Improvement in Electro-Chemical Treatment of Ores for the Production of Electricity and other Purposes, which improvement is fully set forth in the following specification.

The present invention relates to electro-chemical treatment of ores or metallic masses with a view to the economical production of electricity, and my said invention is based upon the following principles: first, the property which caustic solutions of soda possess of oxidizing and dissolving certain metals, but particularly zinc and lead, with the production and emission of electricity; second, the property which certain metallic solutions possess, particularly those of copper, nickel, cobalt, lead, mercury, silver, gold, &c., of serving as depolarizing agents in a voltaic couple with two liquids, and at the same time setting free the metal or metals contained in the solutions; third, the electro-motive force which results from the action of soda or potash upon a neutral or acid saline solution, which electro-motive force is added to that derived from the solution of zinc or lead in the alkaline solution; fourth, the ability to substitute for the ordinary saline solutions of copper, nickel, cobalt, lead, mercury, &c., crude solutions of these metals in voltaic couples with two liquids, of which one is an alkaline (sodium or potassium) liquor, said solutions resulting from the action of acids upon the ores of the metals, which can be previously roasted, if necessary; fifth, the ability to substitute for zinc or lead themselves in the voltaic couples with alkaline liquor a conducting-ore rich in or enriched with zinc or lead; sixth, the ability to substitute for plates or rods of zinc and lead themselves in said voltaic couples small pieces, scraps, or filings of lead or zinc.

In carrying out this invention a voltaic couple with two liquids is formed. One of these liquids is a solution of caustic soda or potash, and in it is plunged either an anode of zinc or lead, or fragments of rich galena, which is a conductor of electricity, or fragments of calamine or other rich and conducting ore of zinc. On these fragments is placed a plate of lead or zinc, which extends above the surface of the solution and serves as a conductor or pole. The other liquid is a cuprous or cupric solution obtained by the action of acid upon an ore of copper. Such solutions can be obtained by the processes described by Becquerel, or by other known means appropriate to the nature and richness of the ore. If malachite is employed, it is dissolved after crushing in sulphuric acid. Quartz ores are dissolved in sulphuric acid after an oxidizing roasting, or they can also be sulphated by the combined action of sulphurous acid, water-vapor, and air. Poor oxidated ores are subjected for several days to the action of dilute hydrochloric acid. If one or more couples thus constituted are sufficiently charged and are suitably connected in a battery, they produce an electric current susceptible of utilization for the production of light or motive force, or for other purposes, or indirectly for charging secondary batteries for chemical decomposition, or the like. In the compartment containing the copper solution metallic copper is deposited in the proportion of about 1.17 grams per hour and per weber of electricity produced. In the compartment containing the soda the substance collected is principally oxide of zinc or lead, which can ultimately be transformed into metallic zinc or lead by treatment with carbon at a red heat after extracting the soda, as will be hereinafter explained. The metals other than lead and zinc contained in the ores, (usually silver,) not being dissolved by the soda, remain in the battery, whence they can easily be removed. Thus the voltaic action separates the lead or zinc from the other metals, and, furnishing oxides reducible to metallic zinc or lead, constitutes a true metallurgical process.

It will be readily understood that the nature of the materials employed as the metals or ores in the voltaic apparatus above indicated can be varied, as well as the nature and composition of the electrolytic saline solutions which are used in the same couple, the use of the alkaline (sodium or potassium) liquid being constant.

To precipitate the oxide of lead or zinc and regenerate the sodium solution, the following method is preferably employed: The oxide—zinc, for example—which remains in suspension in the sodic liquor is precipitated, either by a current of carbonic acid from burning carbonaceous fuel, or by the carbonic acid in the air, or, still better, by carbonic acid which is disengaged by treating carbonates with an acid adapted to bring them to the state of saline depolarizing-solutions. The precipitation having been accomplished, the oxide of zinc is transformed into carbonate of zinc, which is separated by decantation. The sodic liquor is decanted and separated from the greater part of the oxide of zinc which it contains. It may be little or much carbonated, according to the manner in which the operation has been conducted. In the first case it can be considered as regenerated. In the second case, and this will ordinarily be of more frequent occurrence, it suffices to absorb by lime the carbonic acid it contains and decant a second time. The liquor thus regenerated will be brought back to its primitive strength of caustic soda, with the exception of the quantity transformed into sulphate of soda by the voltaic action. By replacing the carbonic acid with sulphureted hydrogen or chlorine the lead or zinc is eliminated in the state of sulphide or chloride. The electrolyte can also be regenerated by adding carbonate of soda or potash, which parts with its carbonic acid in carbonating the oxide of zinc or lead, so that by one operation the elimination of the metal and the economic restitution of the equivalent of caustic soda, transformed by voltaic action into sulphate, are obtained.

The treatment with carbonic acid, sulphureted hydrogen, chlorine, or alkaline carbonate is applicable, in general, to the regeneration of electrolytes with caustic soda or potash base charged with oxides of zinc or lead. The sulphate of soda or potash formed in the two compartments is recovered by crystallization.

The example just given illustrates the general economy of the new electro-chemical treatment of ores or metals above indicated, permitting the advantageous treatment at one operation of two ores, or an ore and a metal, with the production of electricity.

It is possible, without in any way modifying the essential principles of operation, to give other examples for all ores of zinc or lead, on one hand, and of copper, nickel, cobalt, mercury, silver, and gold, on the other.

The porous partitions used to separate the two electrolytes in the voltaic apparatus are preferably of material not injuriously affected by the liquids used in the battery, such as paper, cloth, skin, membrane, felt, and other permeable and flexible fabrics. The liquors can be rendered more conductive by any known means.

Having now fully described the said invention and the manner of carrying the same into effect, I would observe, in conclusion, that I am aware that a voltaic couple has heretofore been formed with a caustic alkaline solution for an electrolytic liquid, in connection with metallic lead or zinc as the positive element, and a solution of sulphate of copper in the negative cell, and that the oxides of zinc or lead dissolved in the alkaline solution have been recovered by precipitation with an alkaline sulphide; and, further, that it has been proposed to obtain aqueous acid, saline, or other solutions of copper from copper ores, and to employ the said solution as a negative electrolyte in a voltaic couple, thereby precipitating or depositing metallic copper from it at the same time that electricity is produced, and when lead is used as a positive pole in a voltaic couple to recover it from its solution as an oxide by lime, and these things therefore form no part of the present invention; but

What I do claim, and desire to secure by Letters Patent, is—

1. The method of treating ores of zinc and lead for the production of electricity and recovery of the metals by acting upon said ores in a voltaic couple with an electrolytic liquid having caustic alkali as the base, and precipitating the metallic oxides from said liquid, substantially as described.

2. A voltaic couple having as the electropositive element an ore or ores rich in lead or zinc, in connection with a suitable electrolytic liquid, such as a caustic alkaline solution, substantially as described.

3. The method of treating ores for the recovery of the metals therein contained, and the generation of electricity by acting upon ores of copper, nickel, and other electro-negative metals with acid, and thus forming solutions of said metals, employing said solutions in voltaic couples, in connection with an electro-positive element comprising an ore of lead or zinc, and with an electrolytic liquid having caustic alkali as the base, and precipitating the oxide of lead or zinc from the electrolytic liquid, substantially as described.

4. A voltaic couple comprising a crude solution of copper or other electro-negative metal, a caustic alkaline solution, and an ore of zinc or lead immersed in said alkaline solution, substantially as described.

In testimony whereof I have signed this specification in the presence of two subscribing witnesses.

EMILE REYNIER.

Witnesses:
AUG. PARISOT,
S. VERDIENTT.